(12) United States Patent
Chen et al.

(10) Patent No.: US 10,634,838 B2
(45) Date of Patent: Apr. 28, 2020

(54) LIQUID CRYSTAL DISPLAY AND BACKLIGHT MODULE THEREOF

(71) Applicant: WUHAN CHINA STAR OPTOELECTRONICS TECHNOLOGY CO., LTD., Wuhan, Hubei (CN)

(72) Inventors: Qian Chen, Wuhan (CN); Zhongjie Liu, Hubei (CN); Mei Han, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 21 days.

(21) Appl. No.: 15/572,542

(22) PCT Filed: Aug. 3, 2017

(86) PCT No.: PCT/CN2017/095886
§ 371 (c)(1),
(2) Date: Nov. 8, 2017

(87) PCT Pub. No.: WO2019/000561
PCT Pub. Date: Jan. 3, 2019

(65) Prior Publication Data
US 2019/0004234 A1    Jan. 3, 2019

(30) Foreign Application Priority Data
Jun. 30, 2017  (CN) .......................... 2017 1 0522698

(51) Int. Cl.
*G02F 1/1335* (2006.01)
*G02F 1/1333* (2006.01)
(Continued)

(52) U.S. Cl.
CPC ........... *G02B 6/0021* (2013.01); *G02B 6/009* (2013.01); *G02B 6/0016* (2013.01); *G02B 6/0038* (2013.01); *G02B 6/0055* (2013.01)

(58) Field of Classification Search
None
See application file for complete search history.

(56) References Cited

U.S. PATENT DOCUMENTS 9,423,556 B2 * 8/2016 Lee ................... G02F 1/133308
2006/0125981 A1 * 6/2006 Okuda .............. G02F 1/133308
349/110

(Continued)

FOREIGN PATENT DOCUMENTS

CN    101603658 A      12/2009
CN    202284748 U  *   6/2012
(Continued)

*Primary Examiner* — Edward J Glick
*Assistant Examiner* — Anthony G Quash
(74) *Attorney, Agent, or Firm* — Mintz Levin Cohn Ferris Glovsky and Popeo, P.C.; Steven M. Jensen

(57) ABSTRACT

The present disclosure provides a liquid crystal display and a backlight module which includes a reflective sheet, a light guide plate disposed on the reflective sheet, an optical assembly and a light source assembly, the light guide plate including a light guide portion and a support portion disposed to surround the light guide portion, and the optical assembly being located on a top of the light guide portion; and the light source assembly including a plurality of LEDs which are disposed between the support portion and the light guide portion and disposed to be opposite to an incident surface of the light guide portion. The light guide plate according to the present disclosure includes a light guide portion and a support portion disposed to surround the light guide portion, wherein the support portion is used to support the display module and fix the backlight module, thereby omitting a rubber frame.

14 Claims, 2 Drawing Sheets

(51) Int. Cl.
   *F21V 8/00*      (2006.01)
   *G02B 6/42*      (2006.01)

(56)         References Cited

U.S. PATENT DOCUMENTS

2007/0211192 A1    9/2007  Ahn
2008/0291356 A1 * 11/2008  Kim ................... G02B 6/0088
                                                        349/58
2010/0328570 A1 * 12/2010  Kim ................... G02B 6/0088
                                                        349/58
2016/0187713 A1 *  6/2016  Jung ................ G02F 1/133308
                                                        349/58
2017/0176667 A1 *  6/2017  Zhang et al. ........ G02B 6/0055
2017/0192148 A1 *  7/2017  Shang .................... G02B 6/009

FOREIGN PATENT DOCUMENTS

CN        202394007 U       8/2012
CN        203131623 U       8/2013
CN        103592795 A       2/2014
CN        203500982 U       3/2014
CN        104456302 A       3/2015
CN        104763910 A       7/2015
CN        105650542 A       6/2016
CN        105739173 A       7/2016
JP       2003066418 A   *   3/2003
JP       2009238397 A   *  10/2009
KR       20160059005 A      5/2016

* cited by examiner

LIQUID CRYSTAL DISPLAY AND BACKLIGHT MODULE THEREOF

CROSS-REFERENCES TO RELATED APPLICATIONS

This application is a U.S. national phase application, pursuant to 35 U.S.C. § 371, of PCT/CN2017/095886, filed Aug. 3, 2017, designating the United States, which claims priority to Chinese Application No. 201710522698.7, filed Jun. 30, 2017. The entire contents of the aforementioned patent applications are incorporated herein by this reference.

BACKGROUND OF THE INVENTION

Technical Field

The present disclosure relates to a technical field of a liquid crystal display, especially to a liquid crystal display and a backlight module thereof.

Related Art

A liquid crystal display has advantages, such as thin body, low consumption and no radiation, etc., and the application thereof is wider and wider. The liquid crystal display is a passive light emitting display and needs a backlight module to provide a light source thereof. An existing backlight module generally includes a rubber frame for supporting a display module and fixing the backlight module. However, on one hand, a process of disposing the rubber frame increases a manufacturing cost and a weight of the liquid crystal display, and on the other hand, such a process increases an assembling time of the backlight module.

SUMMARY

In order to solve the above problem, the present disclosure provides a liquid crystal display and a backlight module thereof which can reduce a weight and a cost of the backlight module and shorten an assembling time of the backlight module.

According to the specific embodiment the present disclosure, a backlight module is provided which includes a reflective sheet; a light guide plate disposed on the reflective sheet, and comprising a light guide portion and a support portion disposed to surround the light guide portion; an optical assembly being located above the light guide portion; and a light source assembly comprising a plurality of LEDs which are disposed between the support portion and the light guide portion and disposed to be opposite to a light incident surface of the light guide portion.

Alternatively, a plurality of baffles are disposed at intervals on the light incident surface of the light guide portion, and are combined with the support portion to form a plurality of placement grooves into which the plurality of LEDs are accommodated.

Alternatively, the light source assembly further includes a substrate disposed on a top of the plurality of LEDs, the substrate totally covering the plurality of placement grooves.

Alternatively, the substrate extends to a top of the support portion and is adhered to the top of the support portion.

Alternatively, the substrate extends to the top of the light guide portion and is adhered to the top of the light guide portion.

Alternatively, a plurality of embossments are disposed on surfaces of the light guide portion contacting the support portion, and a plurality of grooves which one-to-one correspond to the plurality of embossments are disposed on the support portion.

Alternatively, the support portion is made of an opaque material.

Alternatively, the substrate and the light guide portion are formed integratedly.

The present disclosure further provides a liquid crystal display which includes a display module and the above-mentioned backlight module, the display module being disposed on the backlight module.

The backlight module according to the present disclosure includes a reflective sheet, a light guide plate disposed on the reflective sheet, an optical assembly and a light source assembly, the light guide plate including a light guide portion and a support portion disposed to surround the light guide portion, and the support portion is used to support the display module and fix the backlight module, thereby omitting a rubber frame, reducing a weight of the backlight module and a cost of the backlight module, and shortening an assembling time of the backlight module.

DETAILED DESCRIPTION OF EXEMPLARY EMBODIMENTS

Embodiments of the present disclosure will be described in detail below by referring to the accompany drawings. However, the present disclosure can be implemented in numerous different forms, and the present disclosure should not be explained to be limited to the specific embodiments set forth herein. Instead, these embodiments are provided for explaining the principle and the actual application of the present disclosure, thus those skilled in the art can understand amendments which are suitable for specific intended applications and various embodiments of the present disclosure.

Figure 1:
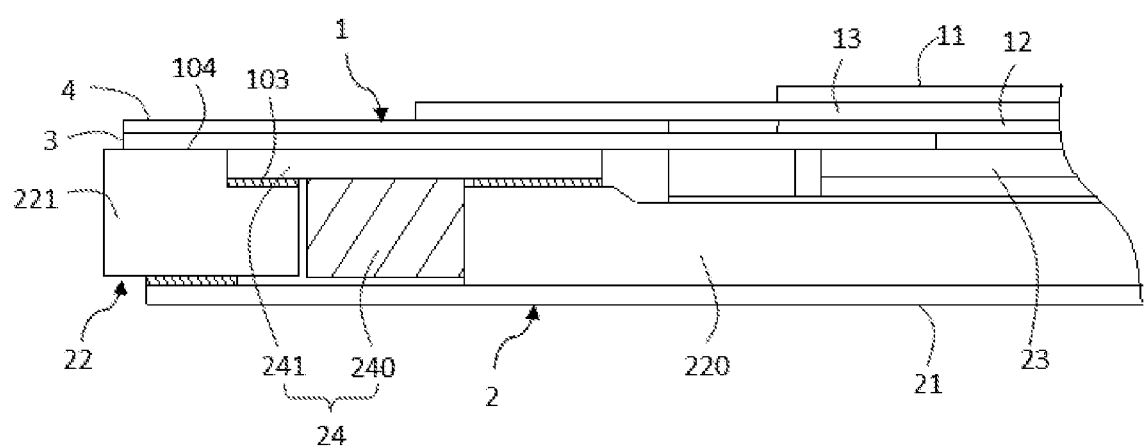
FIG. 1 is a structural schematic diagram of a liquid crystal display.
Figure 2:
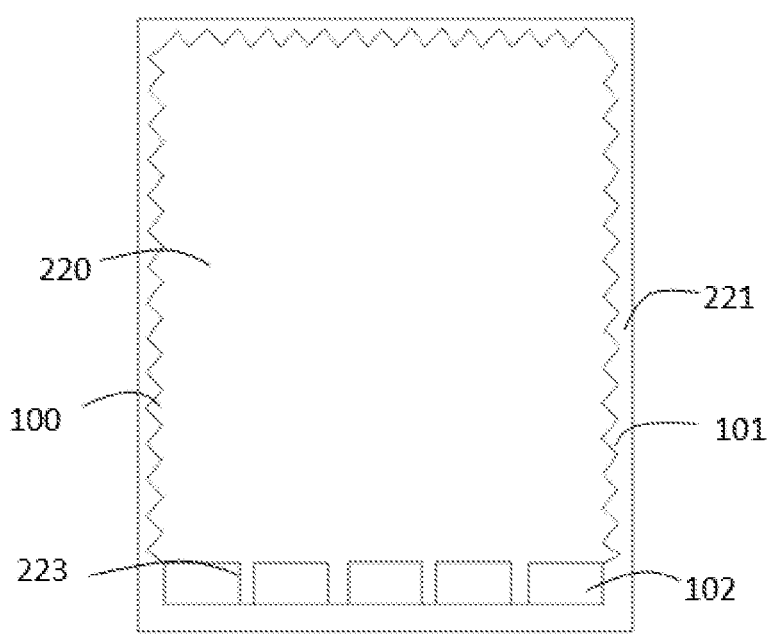
FIG. 2 is a structural schematic diagram of a light guide plate.

Referring to FIGS. 1 and 2, a liquid crystal display according to the present embodiment includes a display module 1 and a backlight module 2. The display module 1 is disposed on the backlight module 2, and the backlight module 2 is used for providing a light source for the display module 1. The backlight module 2 includes a reflective sheet 21, a light guide plate 22 disposed on the reflective sheet 21, an optical assembly 23 and a light source assembly 24. The light guide plate 22 is located on a top of the reflective sheet 21 and includes a light guide portion 220 and a support portion 221 disposed to surround the light guide portion 220, and the optical assembly 23 is located on a top of the light guide portion 220. The light source assembly 24 includes a plurality of LEDs 240 which are disposed between the support portion 221 and the light guide portion 220 and disposed to be opposite to a light incident surface of the light guide portion 220.

The backlight module 2 of the present embodiment is an edge type backlight module. A side surface of the light guide portion 220 is a light incident surface. A light emitted from the LED 240 enters the light guide portion 220 from the incident surface thereof, is emitted from the top of the light guide portion 220 after being reflected many times within the light guide portion 220, and enters the display module 1 after passing through the optical assembly 23, wherein the reflective sheet 21 is used for reflecting the light incident onto a bottom of the light guide portion 220 to prevent the light being emitted from the bottom of the light guide portion 220.

The support portion 221 is formed as a frame structure and is located on the reflective sheet 21 to be disposed to surround an edge of the reflective sheet 21. The support portion 221 and the reflective sheet 21 are adhered through a double-sided adhesive. The plurality of LEDs 240 and the light guide portion 220 are both located within the frame structure formed by the support portion 221. The support portion 221 is made of an opaque material. The support portion 221 and the light guide portion 220 are formed integratedly and form an opaque support portion 221 and a nonopaque light guide portion 220 through a two-component injection molding process. The support portion 221 of the present embodiment may function to support the display module 1 on one hand, and may prevent light leaking from edges of the backlight module 2 on the other hand.

A plurality of embossments 100 are disposed on surfaces of the light guide portion 220 contacting the support portion 221. A plurality of grooves 101 which one-to-one correspond to the plurality of embossments 100 are disposed on the support portion 221. The embossment 100 may have a prismatic shape or a semicircular cylindrical shape. The shape of the groove 101 matches the shape of the embossment 100 so that the light guide portion 220 and the support portion 221 seamlessly contact, thereby preventing bad bright lines caused by the opaque support portion 221 combining with the nonopaque light guide portion 220.

A plurality of baffles 223 are disposed at intervals on a light incident surface of the light guide portion 220, and are combined with the support portion 221 to form a plurality of placement grooves 102, wherein the plurality of LEDs 240 are accommodated into the placement grooves 102 and the placement grooves 102 are one-to-one corresponding to the LEDs 240. Preferably, a plurality of baffles 223 are disposed at equal intervals on an light incident surface of the light guide portion 220.

The light source assembly of the present embodiment further includes a substrate 241 disposed on the top of the plurality of LEDs 240. The substrate 241 totally covers the plurality of placement grooves 102. The substrate 241, the reflective sheet 21, the support portion 221, the light guide portion 220 and the baffles 223 are combined to form a closed space, and the LEDs 240 are located within the closed space, thereby preventing lights emitted from the LEDs 240 leaking from the placement grooves 102. The substrate 241 is a flexible circuit board (FPC).

In order to increase a heat diffusion effect, one end of the substrate 241 extends to a top of the support portion 221, the top of the support portion 221 is provided with a step which includes a first step surface 103 and a second step surface 104, and the one end of the substrate 241 is placed on the first step surface 103 and adhered to the first step surface 103 through a shading adhesive. The thickness of the substrate 241 is less than the distance between the first step surface 103 and the second step surface 104. In addition, the other end of the substrate 241 further extends to the top of the light guide portion 220 and is adhered to the top of the light guide portion 220.

The display module 1 of the present embodiment includes an upper polarization sheet 11, a lower polarization sheet 12 and a display assembly 13 between the upper polarization sheet 11 and the lower polarization sheet 12. The lower polarization sheet 12 is located above the optical assembly 23. The liquid crystal display of the present embodiment further includes a shading rubber layer 3 disposed between the display module 1 and the backlight module 2, one end of the shading rubber layer 3 is adhered to the second step surface 104, the other end of the shading rubber layer 3 is adhered to an upper surface of the optical assembly 23, and light leaking from the backlight module 2 may be further prevented through the shading rubber layer 3. The liquid crystal display further includes a rubber layer 4 disposed between the shading rubber layer 3 and the display assembly 13.

The light guide plate 22 of the present embodiment includes a light guide portion 220 and a support portion 221 disposed to surround the light guide portion 220, due to the support portion 221 used to supporting the display module 1 and the backlight module 2, a rubber frame is omitted, and thus a weight of the backlight module 2 and a cost of the backlight module 2 are reduced and an assembling time of the backlight module 2 is shortened.

The above statements are only the specific embodiments of the present application, it should be pointed out that, to those ordinary skilled in the art, several improvements and polish can be made without departing from the principle of the present application, and also, those improvements and polish should be considered to be within the protection scope of the present application.

What is claimed is:

1. A backlight module, comprising:
    a reflective sheet;
    a light guide plate disposed on the reflective sheet, and comprising a light guide portion and a support portion disposed to surround the light guide portion;
    an optical assembly being located on a top of the light guide portion; and
    a light source assembly comprising a plurality of LEDs which are disposed between the support portion and the light guide portion and disposed to be opposite to a light incident surface of the light guide portion,
    wherein a plurality of embossments are continuously disposed to form a saw-tooth shape along an entire surface of the light guide portion that abuts the support portion, and a plurality of grooves which one-to-one correspond to the plurality of embossments are disposed on the support portion, and
    wherein the plurality of embossments and the plurality of grooves prevent a line from forming at an interface between the support portion and the light guide portion.

2. The backlight module of claim 1, wherein a plurality of baffles are disposed at intervals on the light incident surface of the light guide portion, and are combined with the support portion to form a plurality of placement grooves into which the plurality of LEDs are accommodated.

3. The backlight module of claim 2, wherein the light source assembly further comprises a substrate disposed on a top of the plurality of LEDs, the substrate totally covering the plurality of placement grooves.

4. The backlight module of claim 3, wherein the substrate extends to a top of the support portion and is adhered to the top of the support portion.

5. The backlight module of claim 4, wherein the substrate extends to the top of the light guide portion and is adhered to the top of the light guide portion.

6. The backlight module of claim 1, wherein the support portion is made of an opaque material.

7. The backlight module of claim 6, wherein the support portion and the light guide portion are formed integratedly.

8. A liquid crystal display, comprising:
a display module; and
a backlight module, comprising:
a reflective sheet;
a light guide plate disposed on the reflective sheet, and comprising a light guide portion and a support portion disposed to surround the light guide portion;
an optical assembly being located on a top of the light guide portion; and
a light source assembly comprising a plurality of LEDs which are disposed between the support portion and the light guide portion and disposed to be opposite to a light incident surface of the light guide portion,
wherein a plurality of embossments are continuously disposed to form a saw-tooth shape along an entire surface of the light guide portion that abuts the support portion, and a plurality of grooves which one-to-one correspond to the plurality of embossments are disposed on the support portion,
wherein the plurality of embossments and the plurality of grooves prevent a line from forming at an interface between the support portion and the light guide portion, and
wherein the display module is disposed on the backlight module.

9. The liquid crystal display of claim 8, wherein a plurality of baffles are disposed at intervals on the light incident surface of the light guide portion, and are combined with the support portion to form a plurality of placement grooves into which the plurality of LEDs are accommodated.

10. The liquid crystal display of claim 9, wherein the light source assembly further comprises a substrate disposed on a top of the plurality of LEDs, the substrate totally covering the plurality of placement grooves.

11. The liquid crystal display of claim 10, wherein the substrate extends to a top of the support portion and is adhered to the top of the support portion.

12. The liquid crystal display of claim 11, wherein the substrate extends to the top of the light guide portion and is adhered to the top of the light guide portion.

13. The liquid crystal display of claim 8, wherein the support portion is made of an opaque material.

14. The liquid crystal display of claim 13, wherein the support portion and the light guide portion are formed integratedly.

* * * * *